(12) United States Patent
Osaka et al.

(10) Patent No.: US 7,012,567 B2
(45) Date of Patent: Mar. 14, 2006

(54) APPROACH POSITION INPUT DEVICE

(75) Inventors: Tadashi Osaka, Kashiwa (JP); Takashi Yoshida, Minori (JP); Kazushi Yoshida, Chiyoda (JP); Ryoko Ichinose, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/023,587

(22) Filed: Dec. 29, 2004

(65) Prior Publication Data
US 2005/0206565 A1    Sep. 22, 2005

(30) Foreign Application Priority Data
Mar. 22, 2004    (JP)    .............................. 2004-081823

(51) Int. Cl.
*G01S 5/04* (2006.01)
(52) U.S. Cl. ...................................... 342/433; 342/374
(58) Field of Classification Search ................ 342/372, 342/374, 433, 437, 448
See application file for complete search history.

(56) References Cited

U.S. PATENT DOCUMENTS 4,658,373 A * 4/1987 Murakami et al. .......... 700/213
5,280,631 A * 1/1994 Nakahi et al. ................ 455/65
5,739,812 A * 4/1998 Mochizuki et al. ......... 345/163
5,792,997 A * 8/1998 Fukuzaki .................. 178/18.07
6,020,849 A * 2/2000 Fukuzaki ..................... 342/374

FOREIGN PATENT DOCUMENTS

JP    2000-020229    1/2000
JP    2002-342033    11/2002

* cited by examiner

*Primary Examiner*—Dao Phan
(74) *Attorney, Agent, or Firm*—Antonelli, Terry, Stout and Kraus, LLP.

(57) ABSTRACT

An approach position input device includes a plurality of antennas arranged in the form of a lattice. An oscillator applies a high-frequency ac voltage to the antennas. A signal processing circuit processes signals from the antennas. A change-over switch including switching elements sequentially changes over a connection between the antennas and the signal processing circuit. CPU sends a selection signal to the change-over switch for antenna selection. CPU calculates an approach position of a human body according to signals from the signal processing circuit. CPU instructs the change-over switch to apply the ac voltage from the oscillator only to the antenna selected according to the selection signal.

11 Claims, 11 Drawing Sheets

| ANTENNA CHANNEL | ch1 | ch2 | ch3 | ch4 | ch5 | ch6 | ch7 | ch8 | ch9 | ch10 |
|---|---|---|---|---|---|---|---|---|---|---|
| REFERENCE VALUE | 4.8 | 4.9 | 5.0 | 4.4 | 4.9 | 5.1 | 4.7 | 4.8 | 4.6 | 4.7 |
| OBTAINED OUTPUT VALUE | 4.9 | 3.4 | 2.9 | 3.6 | 4.8 | 2.8 | 3.6 | 4.6 | 4.5 | 4.6 |
| DIFFERENTIAL VALUE | −0.1 | 1.5 | 2.1 | 0.8 | 0.1 | 2.3 | 1.1 | 0.2 | 0.1 | 0.1 |

APPROACH POSITION INPUT DEVICE

INCORPORATION BY REFERENCE

The present application claims priority from Japanese Patent Application JP2004-081823 filed on Mar. 22, 2004, the content of which is hereby incorporated by reference into this application.

BACKGROUND OF THE INVENTION

The present invention relates to an input device for an information terminal such as a personal computer (PC), and in particular, to an approach position input device to detect a position of, for example, a fingertip of an operator.

JP-A-2002-342033 describes an example of a user's input device of non-contact type for use with a personal computer or the like. To recognize information items such as positional information items of two or more points, a contour of an approaching object, and distance to the object, the input device includes a plurality of transmission electrodes, a transmitter, a plurality of reception electrodes, and a receiver to receive an alternating current (ac) flowing through the reception electrodes. The transmitter supplies an alternating current for transmission to each of the transmission electrodes. The reception electrodes are disposed not to be in contact with the respective transmission electrodes.

The input device includes a first capacitor equivalent circuit virtually formed at each intersection between the transmission electrodes and the reception electrodes. When a conductive object such as a fingertip of a user approaches the input device, a second capacitor equivalent circuit is virtually formed in parallel with an associated first capacitor equivalent circuit. Electrostatic capacity of the second capacitor equivalent circuit varies according to distance to the conductive object approaching the input device.

JP-A-2000-020229 describes another conventional example of the position detecting device. This device simplifies signal processing to improve noise resistance performance and operability and includes a voltage vibrating system. The system includes a sensor panel or a sensor conductor array, a shield plate, a signal process circuit, a ground, and a current. The position detecting device conducts a ground signal process for electric vibration equivalently received via electrostatic coupling from a conductor to be detected and transmits a result of the process via an isolator to a non-vibration system.

The input device described in JP-A-2002-342033 can measure distance between the input device and a fingertip or can detect an event in which a fingertip is in touch with the input device. However, the transmission electrodes (m in number; m is an arbitrary number) to receive an alternating current and the reception electrodes (n in number; n is an arbitrary number) to receive a signal are separated from each other. Therefore, it is necessary to acquire the signal (m×n) times to detect information of a contour of an object such as a fingertip approaching the input device and distance therebetween. As a result, the detection period of time required to detect the event becomes longer. Although precision of detection is improved by increasing the numbers respectively of the transmission and reception electrodes, the increase in the number of electrodes elongates the detection period of time. This results in a disadvantage that the operator feels a slow reaction or a long reaction time of the input device.

The position detecting device described in JP-A-2000-020229 can detect an event in which a finger approaches the sensor conductor array. However, since the device detects the event using electrostatic capacity, a signal level of either x-directional reception signal or y-directional reception signal changes depending on cases. Therefore, when an approach position is obtained using only the signal level of x-directional reception signal or y-directional reception signal, there exits a fear of erroneous detection since an environmental change is not taken into consideration.

BRIEF SUMMARY OF THE INVENTION

It is therefore an object of the present invention, which has been devised in consideration of the problem of the prior art, to provide an approach position input device capable of achieving multipoint detection.

Another object of the present invention is to provide an approach position input device capable of reducing the detection period of time.

Still another object of the present invention is to provide an approach position input device having a simple configuration.

Further another object of the present invention is to provide an approach position input device capable of correctly detecting approach of a human body even when an environment thereof changes.

To achieve the objects, there is provided an approach position input device according to an aspect of the present invention. The device includes a large number of first antennas arranged substantially in parallel with each other, a large number of second antennas arranged substantially in parallel with each other, the second antennas being arranged in a direction to intersect the first antennas; a unit for applying an alternating current (ac) voltage to the first and second antennas, a signal processing circuit for processing output signals outputted from the first and second antennas, and a change-over switch for selectively sending the output signals from the first and second antennas to the signal processing circuit. The switch conducts the antenna selection to send an output signal from only one of the antennas to the signal processing circuit at a time.

In the aspect, the approach position input device further includes a computing device (CPU) for outputting a signal to make the change-over switch conduct a change-over operation. The signal processing circuit favorably includes a high-pass filter for extracting signals having a frequency equal to or more than a predetermined frequency from the signals sent from the first and second antennas, a full-wave rectifier for conducting full-wave rectification for signals filtered by the high-pass filter, an integrating circuit for integrating a signal outputted from the full-wave rectifier, and an analog-to-digital (AD) converter for converting an analog signal integrated by the integrating circuit into a digital signal.

The signal processing circuit obtains difference values of the first and second antennas by subtracting reference values of the respective antennas beforehand obtained for the antennas from the signals outputted from the first antennas and the signals outputted from the second antennas. The circuit may determine that a human body or the like is in the vicinity if any ones of the difference values are equal to or more than a predetermined value. Or, the signal processing circuit may determine an intersection between the first antenna of which the difference value equal to or more than a predetermined value and the second antenna of which the difference value equal to or more than a predetermined value so as to recognize the intersection as a point of approach of the human body.

When the first antennas are n in number (n is a positive integer) and the second antennas are m in number (m is a positive integer), the change-over switch may detect approach of the human body in a unit of (n+m) change-over operations. It is favorable that the change-over switch first sequentially changes over n first antennas and then sequentially changes over m second antennas. It is desirable to arrange an insulator between the first antennas and the second antennas.

To achieve the objects, there is provided an approach position input device according to another aspect of the present invention. The device includes a plurality of antennas arranged in the form of a lattice, an oscillator circuit for applying a high-frequency ac voltage to the antennas, resistors connected between the oscillator circuit and the antennas, a signal processing circuit for processing output signals outputted from the antennas, a change-over switch disposed between the antennas and the signal processing circuit for sequentially changing over the antennas, and a computing device for sending an antenna selection signal to the change-over switch.

In the aspect, it is favorable that the signal processing circuit detects reduction in the ac voltage applied to the antennas by a capacitor virtually formed, when a human body approaches the antennas, between the human body and the antennas and the computing device determines that a human body is in the vicinity according to a detection signal produced at detection of the reduction in the ac voltage. Or, it is also favorable that the antennas are arranged in an x direction and a y direction vertical to the x direction, the change-over switch sends signals to the signal processing circuit by sequentially changing over the x-directional and y-directional antennas, and for each of the x-directional and y-directional antennas, when a signal associated with the antenna sent from the signal processing circuit differs from a reference value thereof by a value equal to or more than a predetermined value, the computing device selects the antenna to thereby select at least one x-directional antenna and at least one y-directional antenna and determines an approach position of the human body according to the x-directional and y-directional antennas selected as above.

To achieve the objects, there is provided an approach position input device according to still another aspect of the present invention. The device includes a plurality of antennas arranged in the form of a lattice, an oscillator circuit for applying a high-frequency ac voltage to the antennas, a signal processing circuit for processing output signals outputted from the antennas, a change-over switch connected to the antennas for sequentially changing over the antennas, a resistor connected between the oscillator circuit and the antennas, and a computing device for sending an antenna selection signal to select one of the antennas to the change-over switch and calculating an approach position of a human body according to a signal from the signal processing circuit. The oscillator circuit is connected via the resistor to a position between the change-over switch and the signal processing circuit to apply the ac voltage from the oscillator circuit only to an antenna selected according to the antenna selection signal.

Other objects, features and advantages of the invention will become apparent from the following description of the embodiments of the invention taken in conjunction with the accompanying drawings.

DETAILED DESCRIPTION OF THE INVENTION

Referring now to the drawings, description will be given of embodiments of an approach position input device according to the present invention.

Figure 1:
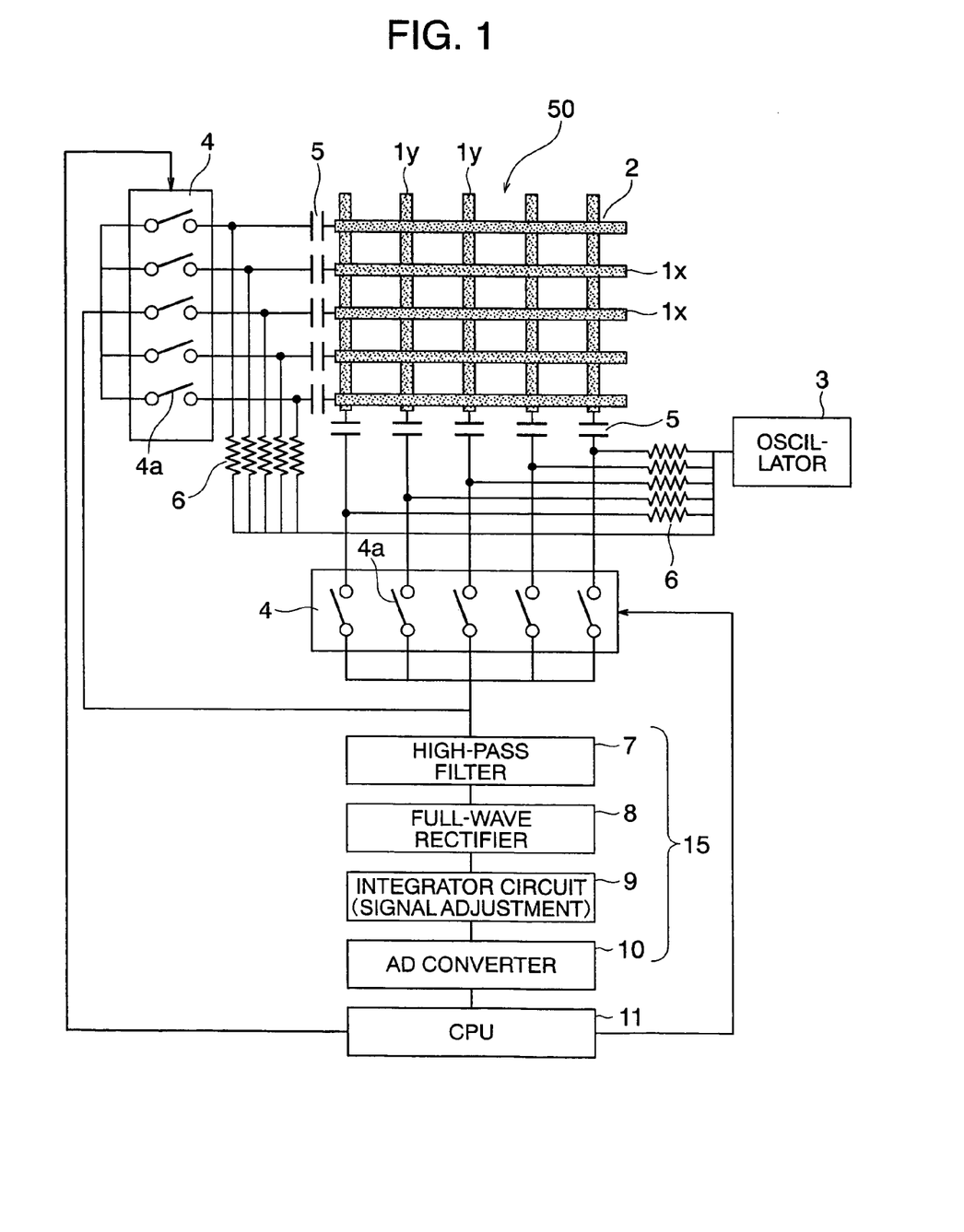
FIG. 1 is a block diagram showing an embodiment of an approach position input device according to the present invention.

FIG. 1 shows an approach position input device 50 in a block diagram. The device 50 includes an antenna section 2 in which a large number of antennas 1x, 1x, . . . and 1y, 1y, . . . are arranged in the form of a lattice in two directions x and y substantially vertical to each other. Capacitors 5, 5, . . . are respectively connected to the x-directional antennas 1x. The other side of each capacitor 5 opposing to the antenna 1x side is connected via a resistor 6 to an oscillator 3. The capacitor 5 is connected to a switching element 4a in parallel with the resistor 6 and the oscillator 3. The switching elements 4a collectively form a change-over switch 4.

The other sides of the switching elements 4a are gathered to be connected to a high-pass filter 7, a full-wave rectifier 8, an integrating circuit 9, an analog-to-digital (AD) converter 10, and a central processing unit (CPU) 11 in this order. The constituent components 7 to 10 form a signal processing circuit 15. The configuration also applies to the y direction. Each y-directional antenna 1y has a line including a capacitor 5, a resistor 6, and an oscillator 3 and a line including a capacitor 5, a switching element 4a, a signal processing circuit 15, and CPU 11. The line of the x-directional antenna 1x is coupled with the line of the y-directional antenna 1y between the oscillator 3 and the resistor 6 and between the high-pass filter 7 and the switching element 4a.

In this configuration, the components of the approach position input device 50 operate as follows. The oscillator 3 applies a high-frequency sine-wave signal to the antenna section 2. The switching elements 4a sequentially changes connection between the antenna section 2 and the signal processing circuit 15. The capacitor 5 removes a direct-current component from signals received by the antennas 1x and 1y. The high-pass filter 7 passes therethrough only a signal having a frequency equal to or more than a predetermined frequency. Since signals having a frequency in the vicinity of an oscillation frequency of the oscillator 3 are sent to the full-wave rectifier 8, low-frequency noise is also removed by the high-pass filter 7.

The full-wave rectifier 8 rectifies a signal while obtaining an absolute value thereof. The signal from the high-pass filter 7 is a sine-wave signal and vibrates in a plus range and a minus range. In order to input the signal to the AD converter, the full-wave rectifier 8 converts the signal in the minus range into an absolute value in the plus range. The integrating circuit 9 conducts gain adjustment and offset adjustment. These operations are adjustment for sensitivity to detect presence or absence of approach of a human body and hence are conducted to increase detection sensitivity. The AD converter 10 converts an analog signal from the integrating circuit 9 into a digital signal. CPU 11 produces a selection signal to select one of the switching elements 4a of the change-over switch 4 and receives a signal sent from the AD converter 10. CPU 11 also calculates an approach position of a human body according to a signal from the antenna section 2.

Figure 2:
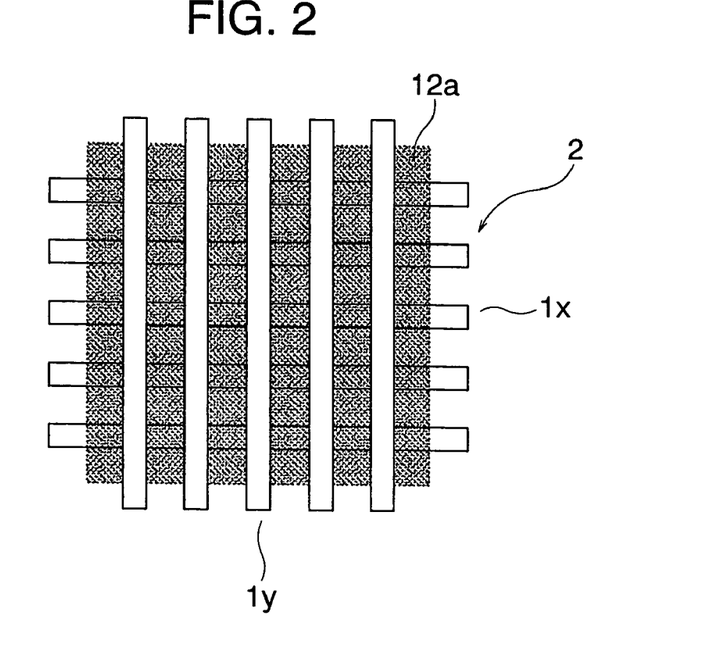
FIGS. 2 and 3 are schematic diagrams showing details of the antenna section used in an approach position input device.
Figure 3:
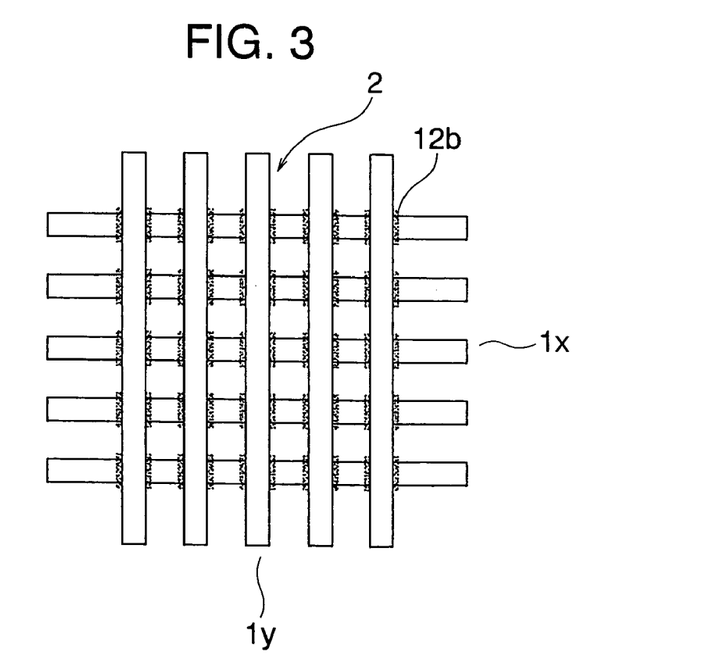

FIGS. 2 and 3 show details of the antenna section 2. This section includes a large number of x-directional antennas 1x and a large number of y-directional antennas 1y. The antennas 1x and 1y are arranged in the form of a lattice. At an intersection of an x-directional antenna 1x and a y-directional antenna 1y, an insulator 12 is inserted therebetween to prevent direct contact between the antennas 1x and 1y.

In the example shown in FIG. 2, the insulator 12 is large enough to entirely cover all intersections between the x-directional and y-directional antennas 1x and 1y and is arranged therebetween. The antennas arranged below the insulator 12 is more apart from a human body than those arranged over the insulator 12. Therefore, sensitivity thereof is slightly lower than that of the antennas (y-directional antennas 1y in the example of FIG. 2) arranged over the insulator 12. To overcome this difficulty, the sensitivity difference due to the insulator 12 and the antennas over the insulator 12 (y-directional antennas 1y in the example of FIG. 2) is beforehand corrected.

FIG. 3 shows another example of the insulator 12. At each intersection between the x-directional and y-directional antennas 1x and 1y, an insulator of a size enough to cover the intersection is arranged. Between an area in which the insulator 12 is arranged and an area in which the insulator 12 is not arranged, the sensitivity of the antennas below the insulator 12 (x-directional antennas 1x in the example of FIG. 3) slightly varies. It is therefore favorable that this configuration is employed to detect a position of coordinates of an intersection between an x-directional antenna 1x and a y-directional antenna 1y.

The antennas 1x and 1y are conductors and are made of copper foil or the like. It is possible to use conductive transparent materials such as indium-tin oxide (ITO) and tin oxide (NESA). The antenna section 2 may be in the form of a planar surface or a curved surface and is disposed on hard material such as resin or soft material such as rubber. The oscillator 3 is connected via the resistors 6 and the capacitors 5 to the antennas 1x and 1y and produces a high-frequency sine-wave signal. The capacitors 5 are disposed according to necessity.

The change-over switch 4 turns connection between the respective antennas 1x and 1y and the signal processing circuit 15 on or off according to a control signal sent from the CPU 11. In the operation, the change-over switch 4 connects the circuit 15 to only one of the x-directional and y-directional antennas 1x and 1y. That is, the system requires only one signal processing circuit 15 and hence the number of parts of the system is advantageously reduced. Therefore, the size of the approach position input device 50 is minimized and the production cost thereof is lowered. For the change-over switch 4, an analog switch or the like is used. When the antennas 1x and 1y are arranged apart from the capacitors 5, the antennas 1x and 1y are connected to the capacitors 5 using shielding wires to reduce influence of external noise.

Figure 4:
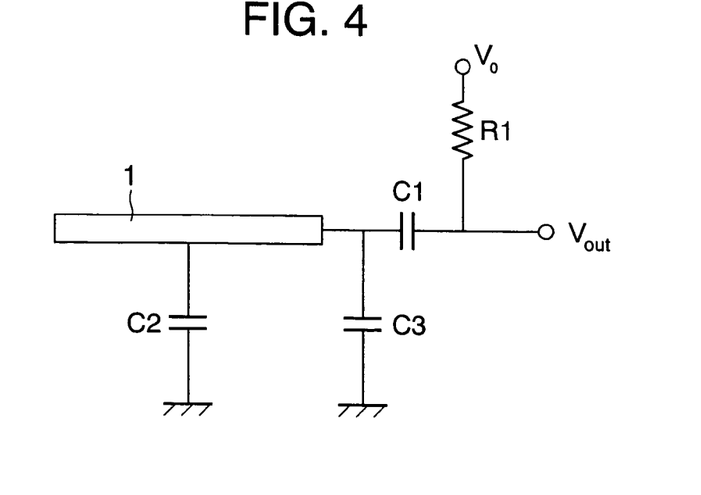
FIG. 4 is a circuit diagram to explain the principle of detection of the approach position input device.

Referring next to FIG. 4, description will be given of the principle of the approach position input device 50 to detect approach of a human body or touch of a finger or the like. FIG. 4 shows an equivalent circuit of one antenna 1 selected from the antennas 1x and 1y. This configuration also applies to the other antennas. FIG. 4 shows a circuit configuration excepting the change-over switch 4 and subsequent components. The oscillator 3 applies an ac voltage $V_0$ of a sine wave to antenna 1. The antenna 1 outputs an output signal $V_{out}$ to a change-over switch 4a, not shown.

Between the antenna 1 and the oscillator 3, a capacitor C1 and a resistor R1 are disposed. The capacitor C1 and the resistor R1 respectively correspond to the capacitor 5 and the resistor 6 of FIG. 1. When a human body or part thereof approaches the approach position input device 50, the human body forms a virtual ground and resultantly configures a virtual capacitor between the antenna 1 and the human body. Assume that electrostatic capacity of the human body is C2 and floating capacity of the antenna 1 is C3 when the human body approaches the antenna 1.

Figure 5:
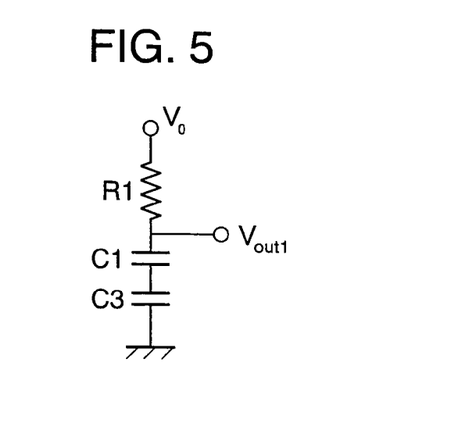
FIGS. 5 and 6 are equivalent circuits of the antenna section.
Figure 6:
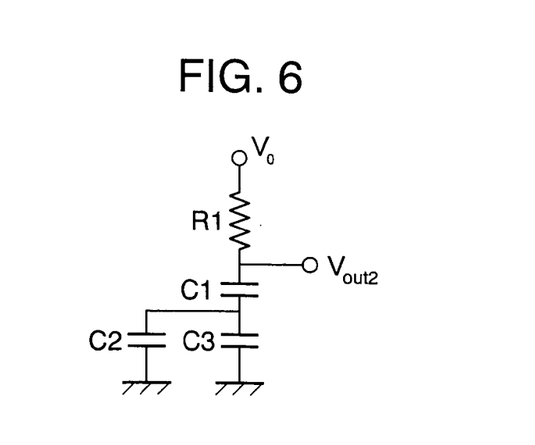

FIG. 5 shows an equivalent circuit when a hand is apart from the antenna 1. FIG. 6 shows an equivalent circuit when a hand is in the vicinity of the antenna 1. When the hand is apart from the antenna 1, the electrostatic capacity C2 of the human body is not coupled with the equivalent circuit of the antenna 1. In contrast thereto, when the hand approaches the antenna 1, the electrostatic capacity C2 is coupled with the equivalent circuit. As can be seen from these circuit diagrams, when the ac voltage is applied to the antenna 1, the output voltage $V_{out2}$ of the circuit of FIG. 6 is less than the output voltage $V_{out1}$ of the circuit of FIG. 5 by an amount of a current flowing into the circuit through the human body.

Figure 7A:
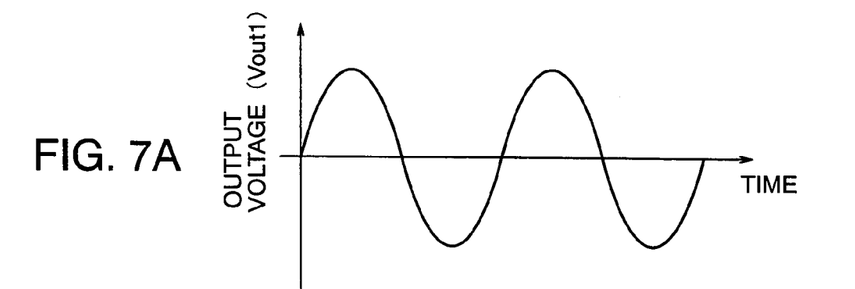
FIGS. 7A and 7B are graphs showing examples of output signals from the circuit shown in FIG. 4.
Figure 7B:
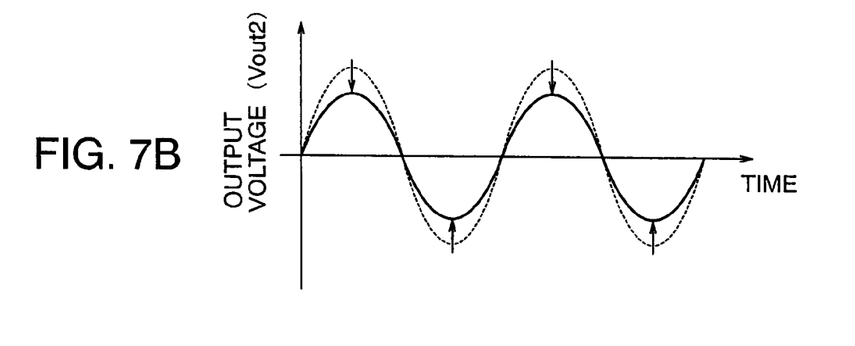

FIGS. 7A and 7B show changes in time of the output voltages $V_{out}$ of the equivalent circuits shown in FIGS. 5 and 6, respectively. Comparing these graphs with each other, the output voltage has smaller amplitude when the hand is in the vicinity of the antenna 1 than when the hand is apart therefrom. The output voltage $V_{out}$ varies depending on whether or not the electrostatic capacity C2 of the human body is coupled with the equivalent circuit. Using this phenomenon, whether or not the human body is in the vicinity of the antenna 1 is detected by measuring the output voltage $V_{out}$.

The detection sensitivity of the approach position input device 50 becomes higher by increasing the difference of the output voltage $V_{out}$ between the case in which the electrostatic capacity C2 of the human body is coupled with the equivalent circuit and the case in which the electrostatic capacity C2 of the human body is not coupled with the equivalent circuit. The electrostatic capacity C2 of the human body is small. It can be hence considered that the capacitor 5 (C1) between the antenna 1 and the oscillator 3 and the floating capacity C3 are substantially fixed regardless of presence and absence of the electrostatic capacity C2 of the human body. Impedance as a basic factor of the output voltage from the oscillator 3 depends on the frequency of the oscillator 3. When the frequency of the oscillator 3 becomes higher, the difference of the output voltage $V_{out}$ becomes greater. However, when the frequency is too high, the output voltage $V_{out1}$ becomes too small. Therefore, the frequency of the oscillator 3 is appropriately adjusted. In the embodiment, the frequency of the oscillator 3 is set to about 800 kHz.

The electrostatic capacity C2 of the human body depends on distance between the human body and the antenna 1. The smaller the distance is, the greater the electrostatic capacity C2 is. Therefore, the more the human body approaches the antenna 1, the smaller the output voltage $V_{out}$ becomes. In this embodiment, since analog signals are used in the approach position input device 50, the distance between the human body and the antenna 1 can be determined by measuring amplitude of the analog signals.

When the insulator 12 exists between the antenna 1 and the human body, the distance therebetween becomes longer, and hence the electrostatic capacity C2 due to the human body lowers. To compensate for the reduction in the impedance, the oscillator 3 applies a high-frequency sine-wave signal to the antenna section 2. This suppresses the reduction in the impedance of the human body, and hence the human body can be detected even if the insulator 12 exists between the antenna 1 and the human body. Therefore, even when an insulator in the form of a sheet is arranged on the surface of the antenna section 2 to protect the antenna section 2 or even when the operator puts on a pair of gloves, a position of a finger of the operator can be detected. In the embodiment, since the oscillator 3 to apply a transmission signal and the signal processing circuit 15 to receive a reception signal are connected to the antenna 1, the signals can be transmitted and received using one antenna, i.e., the antenna 1.

Referring now to the flowchart of FIG. 8 and the detailed diagram of the antenna section of FIG. 9, description will be given of a detection algorithm of the approach position input device 50. FIG. 9 shows the antenna section 2 in which five channels of x-directional antennas 1x (ch1 to ch5) and five channels of y-directional antennas 1y (ch6 to ch10) are arranged in the form of a five-by-five (5×5) matrix. In FIG. 9, a numeral in a small circle indicates a number assigned to an intersection. It is not necessarily required to equally separate the x-directional and y-directional antennas 1x and 1y from each other. It is not necessarily required that the x-directional antennas 1x are vertical to the y-directional antennas 1y.

Figure 8:
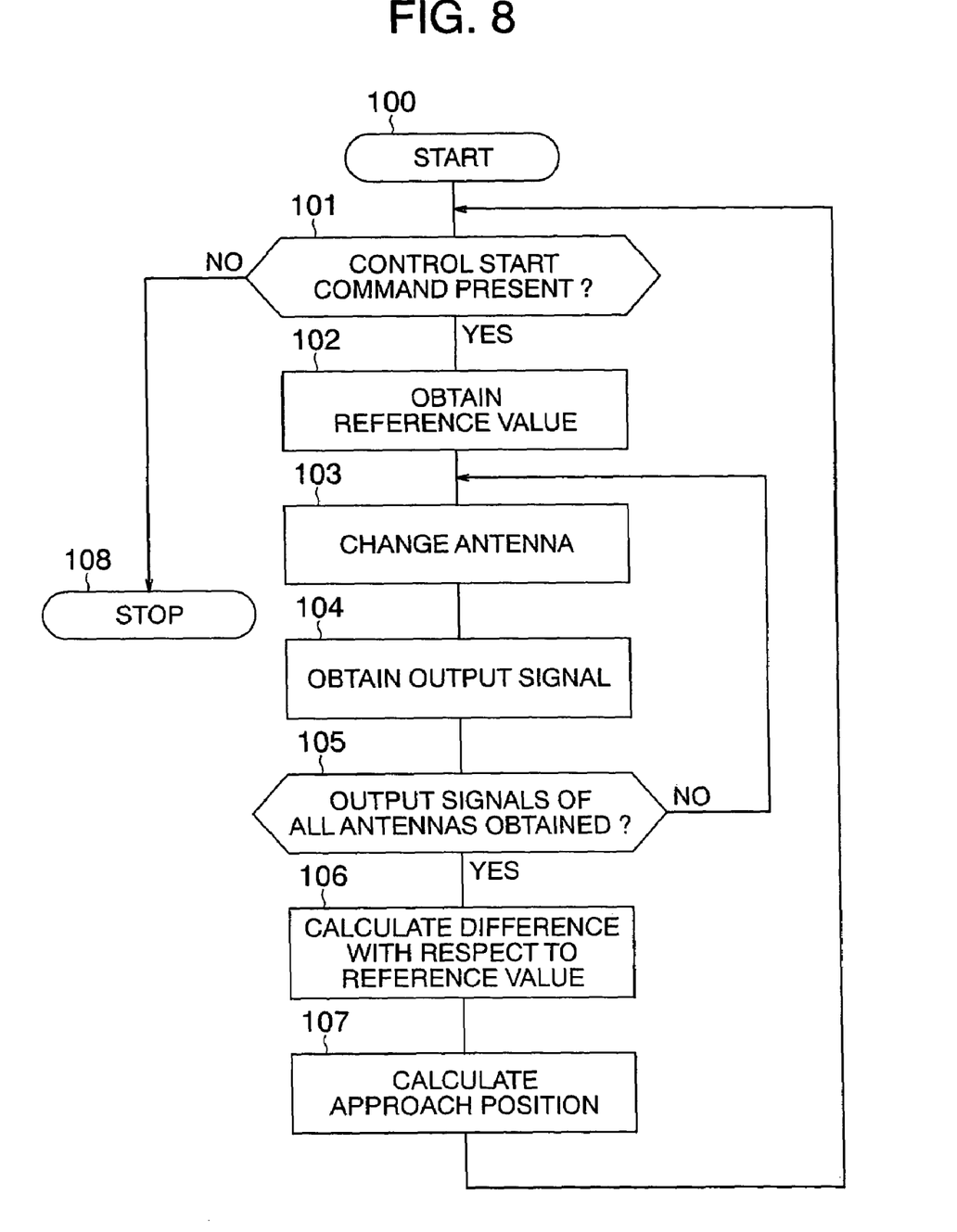
FIG. 8 is a flowchart to explain operation of the approach position input device.
Figure 9:
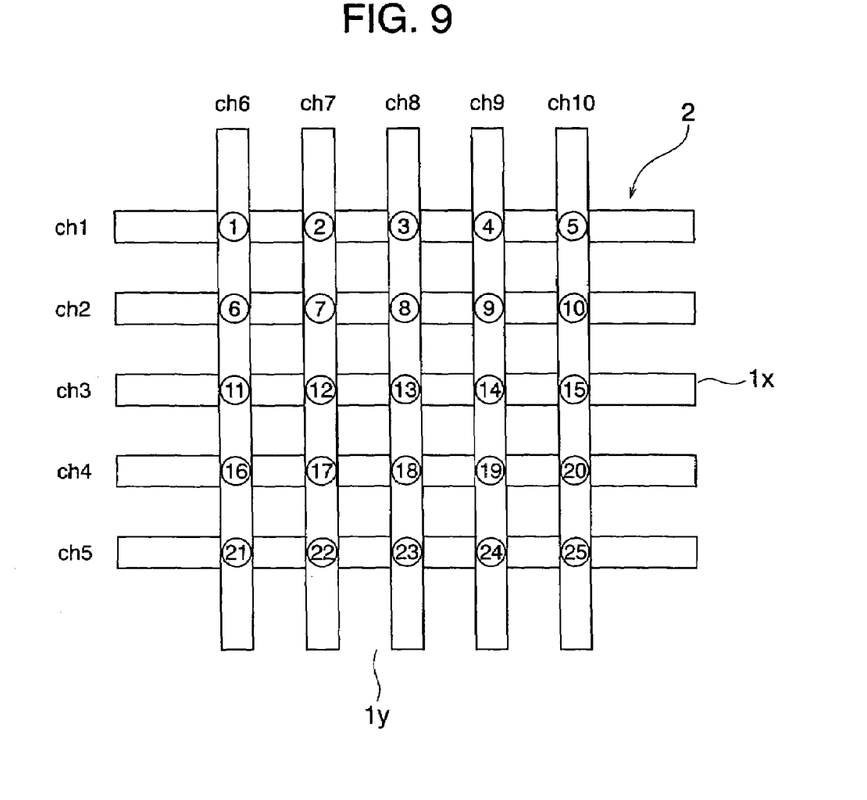
FIG. 9 is a diagram showing details of the antenna section used in the approach position input device.

As can be seen from FIG. 8, CPU 11 makes a check in Step 101 to determine whether or not a control start command of the approach position input device 50 has been issued. If this is the case, process goes to Step 102. In step 102, for each of the channels ch1 to ch10 corresponding to the x-directional and y-directional antennas 1x and 1y, a reference value of an antenna output, which will be described later, is obtained in this order of the antennas. After the reference value is obtained for each channel, a change-over operation of the antenna 1 is conducted in Step 103. Specifically, CPU 11 sends a control signal to the change-over switch 4 to select one of the ten antennas of the channels ch1 to ch10. In Step 104, CPU 11 receives an output signal from the antenna selected by the switch 4.

Figure 10:
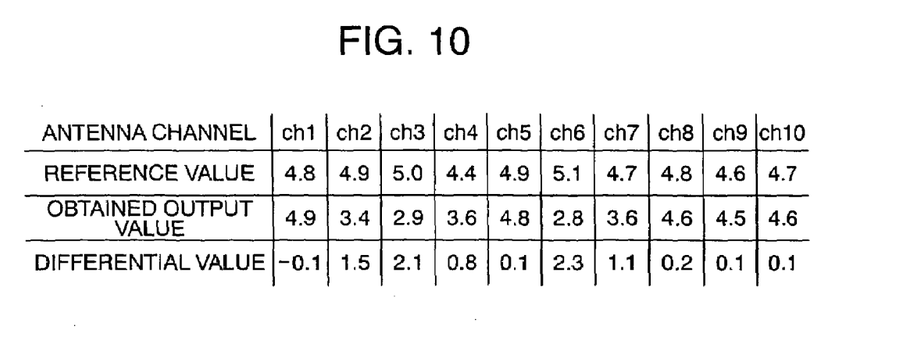
FIG. 10 is a diagram showing an example of output values from a signal processing circuit.

In Step 105, a check is made to determine whether or not output signals have been obtained from all antennas of the channels ch1 to ch10. If this is not the case, control returns to Step 102. The switch 4 selects an antenna from which an output signal has not been obtained to continuously obtain an output signal therefrom. If output signals have been obtained from all antennas, control goes to Step 106. Using data of each antenna or channel, the reference value of each of the channels ch1 to ch10 is subtracted from the output signal thereof obtained in Step 105. FIG. 10 shows an example of difference between the reference value and the output signal for each antenna.

After the difference between the output signal and the reference value is obtained for each antenna, an approach position is calculated in Step 107. CPU 11 makes a search through the difference values of channels ch1 to ch10 obtained in Step 106 for antennas of which each of the difference values is equal to or more than a predetermined threshold value. When a human body approaches, there appear antennas of which each of the difference values is equal to or more than a predetermined threshold value. In such a case, there exist at least one x-directional antenna 1x and one y-directional antenna 1y in any situation. As a result, an intersection between the x-directional and y-directional antennas 1x and 1y is detected as an approach position of the human body.

Assume that the threshold value is 2.0 in the example of FIG. 10. Then, the antennas of the channels ch3 and ch6 exceed the threshold value. Therefore, an intersection 11 between the channels ch3 and ch6 is detected as a position of approach of the human body. Although not shown, by transmitting data of approach positions thus detected to another controller, various output devices connected to the approach position input device 50 can be driven. After the approach position is calculated in Step 107, process returns to Step 101. Until a control end command is issued, the processing of Steps 103 to 107 is repeatedly executed to continuously detect approach positions.

In the embodiment, by sequentially changing the antennas of the channels ch1 to ch10 to determine a channel of the antenna of which the output signal has varied, an approach position of a human body can be detected. Since a plurality of antennas are disposed in the form of a lattice, even when a human body approaches two or more points of the lattice at the same time, different positions can be detected as approach positions of the human body. By executing graphic processing or arithmetic processing for the different approach positions, a plane including the positions or points can be determined or recognized. Size and a shape of an approaching object can also be detected by executing the processing described above.

In the example shown in FIG. 9, to detect data items at 25 intersections between the x-directional and y-directional antennas 1x and 1y, it is required to obtain data items of ten antennas 1x and 1y. That is, in a case in which the antennas are arranged in an m×n matrix, to detect data items of (m×n) intersections (coordinates), it is only necessary to obtain (m+n) data items. Conventionally, (m×n) data items are obtained to detect data items of (m×n) intersections. However, in the embodiment, it is required to obtain only (m+n) data items. This advantageously reduces the detection time required to detect data items.

The electrostatic capacity C2 of a human body has a characteristic to change according to the distance between the antenna and the human body. Therefore, using the signal obtained in Step 104, the boundary of the approach positions can be acquired in a more continuous way, not step by step.

Using the difference values of analog data obtained for the respective antennas of the channels ch1 to ch10 shown in FIG. 10, a position corresponding to the threshold value is obtained. First, antennas exceeding the threshold value are selected and then the difference between the difference values of the antennas adjacent to the selected antenna is obtained. By proportionally distributing the difference, there can be detected an intermediate point other than the intersection between the x-directional and y-directional antennas 1x and 1y.

In this connection, a reference value is set for each antenna 1 in Step 102. This is because fluctuation in the output signal from each antenna is taken into consideration. In Step 106, the difference value is obtained using the reference value and the output signal of the identical channel. To obtain change in time of the output signal, there may be used, in place of this method, a method in which the previous measured value is stored to be compared with a measured value of the current operation. However, when the human body is in contact with the antenna section 2 at one position thereof for a long period of time, the difference value when the human body is brought into contact therewith becomes smaller with a lapse of time. Therefore, to determine whether or not the human body approaches the antenna section 2, the obtained output value is also required. When the obtained output value is smaller than a predetermined value, it is recognized that the human body is in the vicinity of the antenna section 2. Since the difference value becomes smaller when the human body slowly approaches the antenna section 2, the circuit is adjusted to increase sensitivity.

It is also possible to obtain the difference values of the output signals of the respective antennas without using the reference value or by use of a common reference value. Thereafter, using the difference values of the antennas adjacent to the pertinent antenna, the approach position is detected. However, since the output characteristic possibly varies between the antennas, this method is effective when the variation is within an allowable range. When the method to detect the intermediate point other than the intersection is applied to this method, the fluctuation in the output signal from each antenna is beforehand corrected.

Figure 11:
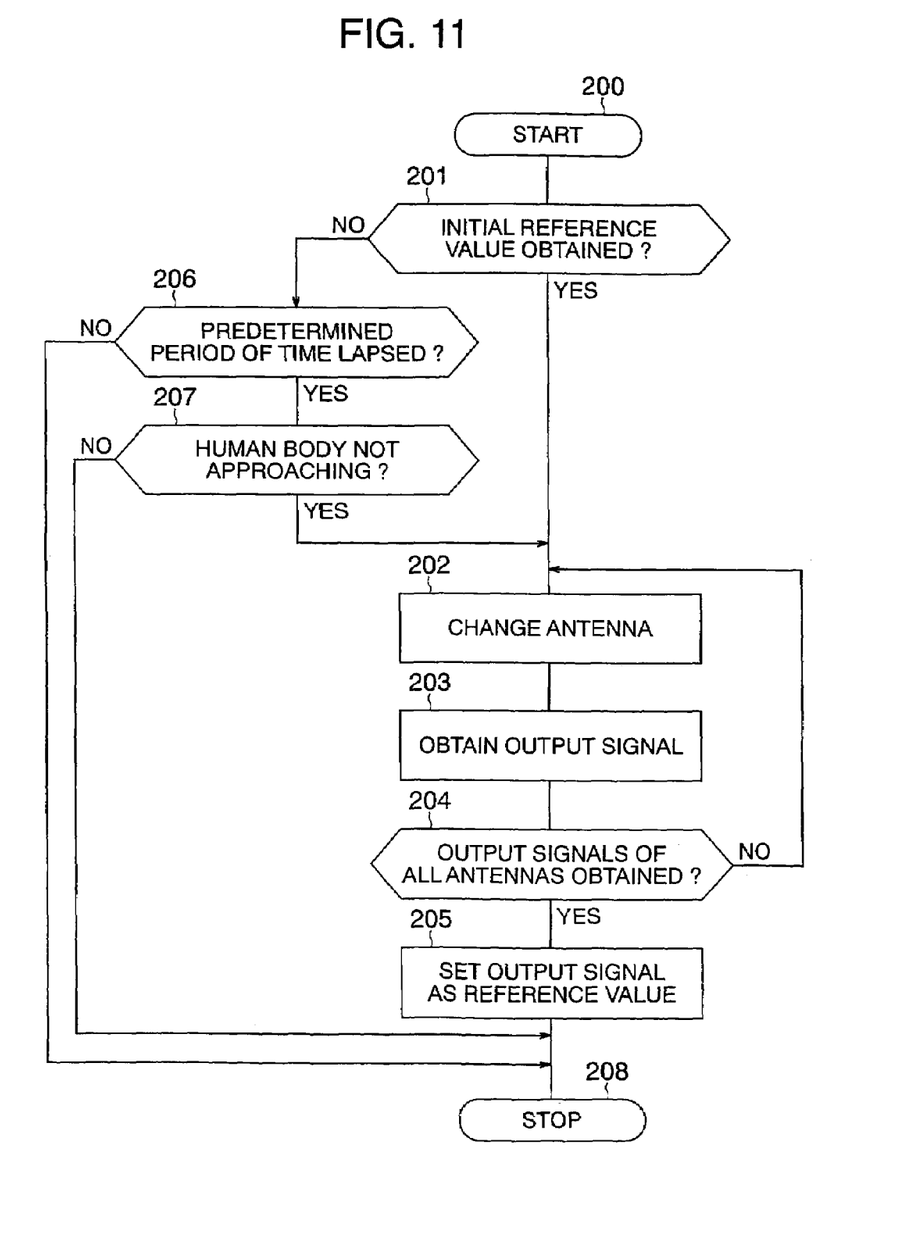
FIG. 11 is a flowchart to explain a method of acquiring reference values.

Referring now to the flowchart of FIG. 11, description will be given of a method of acquiring a reference value. When it is detected in Step 101 that a control start command is beforehand issued and process is in Step 102 to acquire a reference value, an initial state is established. In FIG. 11, a check is made in Step 201 to determine whether or not the operation is the first reference value acquisition after the control operation is started. If this is the first acquisition, the antenna is changed in Step 202. For this purpose, CPU 11 sends a control signal to the change-over switch 4 to select one of the antennas of the channels ch1 to ch10. CPU 11 receives in Step 203 an output signal from the selected antenna 1.

In Step 204, a check is made to determine whether or not output signals from all antennas of the channels ch1 to ch10 have been obtained. If there exists any antenna from which an output signal has not been obtained, process returns to Step 202. A change-over operation is conducted to use the antenna from which an output signal has not been obtained to continuously obtain an output signal. When the output signals from all antennas are obtained, control goes to Step 205. In this step, the output signals from the channels ch1 to ch10 obtained in Step 203 are set as reference values of the respective channels.

If the operation is other than the first reference value acquisition in Step 201, process goes to Step 206 to determine whether or not a predetermined period of time has lapsed after the previous reference value acquisition. If this is the case, process goes to Step 207. Otherwise, process goes to Step 208 to terminate the reference value acquisition processing. In this case, the reference value is not updated.

In Step 207, a check is made to determine whether or not the human body is at a position apart from the input device 50. If the human body is apart from the input device 50, CPU 11 executes the processing of Steps 202 to 205 to update the reference value. If the human body is near the input device 50, control goes to Step 208 to terminate the reference value acquisition processing. In the operation, whether or not the human body is near the input device 50 is determined according to the difference values between the reference values and the output signal of the channels ch1 to ch10. When the difference value is equal to or more than the predetermined threshold value for each channel, it is assumed that the human body is apart from the input device 50. When the difference value is equal to or more than the predetermined threshold value for any one of the channels ch1 to ch10, the reference value is not updated. If the reference value is updated when the human body is near the input device 50, the human body cannot be correctly detected after the update of the reference value.

As above, in principle, the reference value is obtained immediately after the control operation is started. After a lapse of a predetermined period of time, when the human body is apart from the input device 50, the reference value is again obtained to be updated. As a result, even if the output signal varies due to the lapse of time and an environmental change, it is assured to appropriately detect approach of the human body to the input device 50. When it is known that the output signal only slightly varies due to the lapse of time and an environmental change, the procedure of the reference value acquisition can be simplified by removing the operation to update the reference value.

Figure 12:
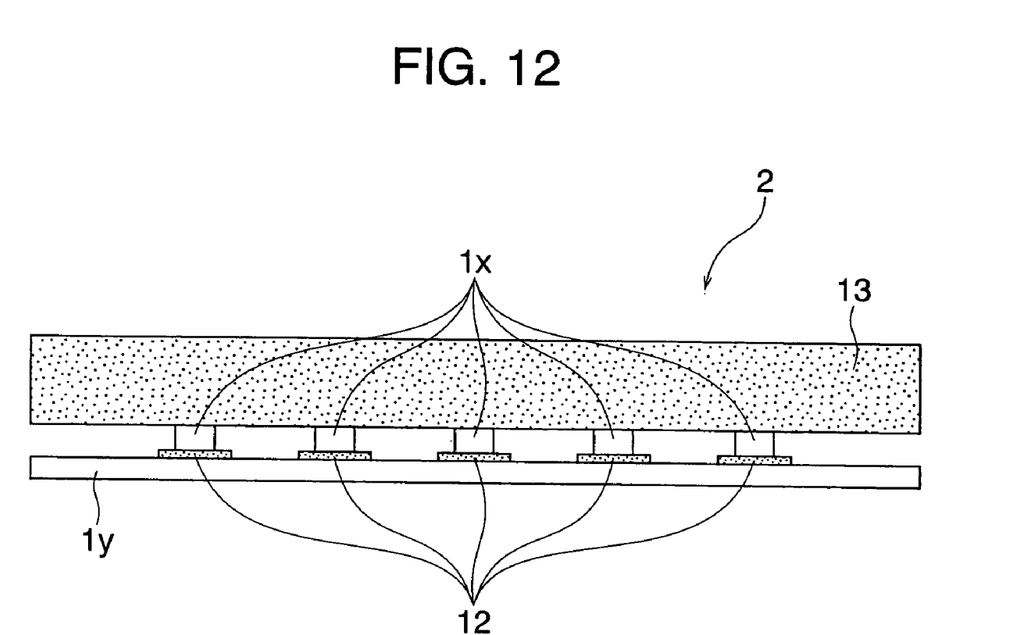
FIG. 12 is a side view of the antenna section.

FIG. 12 shows another example of the antenna section 2. This example includes a plate of a soft material 13 entirely covering an upper surface of the antenna section 2. The soft material 13 has appropriate hardness and thickness. The soft material 13 is, for example, silicone rubber. Thanks to the disposition of the soft material 13, the operator can enjoy a comfortable feeling when he/she touches the material 13. If a relationship between reaction force when the operator depresses the soft material 13 and distance to the antenna section 2 is beforehand obtained, the approach position input device 50 can also detect the depressing force of the human body.

Figure 13:
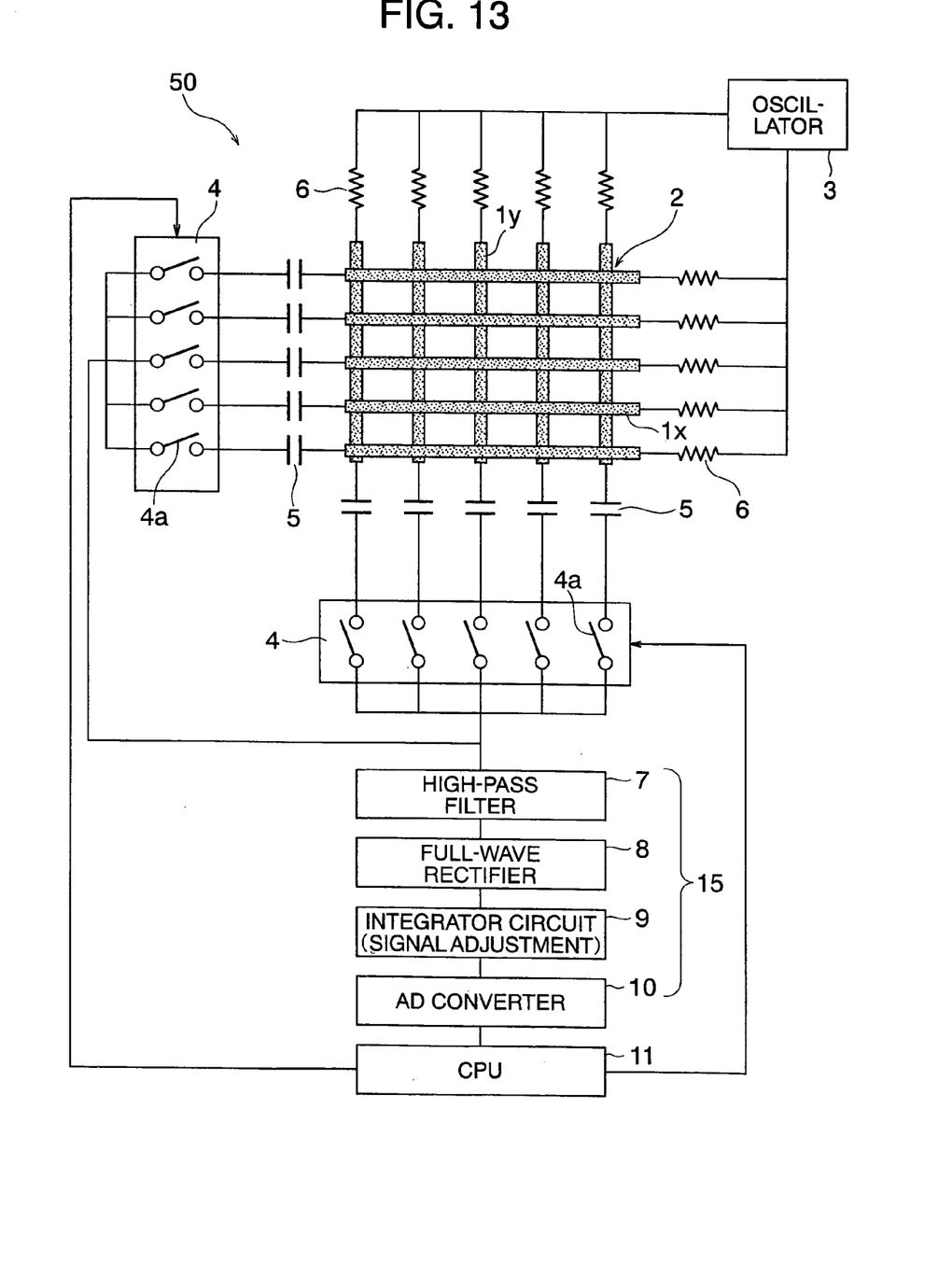
FIG. 13 is a block diagram showing another embodiment of an approach position input device according to the present invention.

Referring now to FIG. 13, description will be given of another example of the approach position input device 50 according to the present invention. Between this embodiment and the above embodiment, the connecting positions between the oscillator 3 and the resistors 6 are changed. That is, each open terminal end (open in the above embodiment) of the antennas 1x and 1y is connected via the resistor 6 to the oscillator 3 in this embodiment. The other circuit configurations and circuit connections are the same as those of the embodiment described above. The embodiment shown in FIG. 1 is suitable for a system configuration in which the antennas 1x and 1y are connected via long wires to the capacitors 5 to separate the antenna section 2 from the other circuits. In contrast thereto, the present embodiment is suitable for a system configuration in which the antennas 1x and 1y are connected via short wires to the capacitors 5 to dispose the antenna section 2 in the vicinity of the other circuits.

Figure 14:
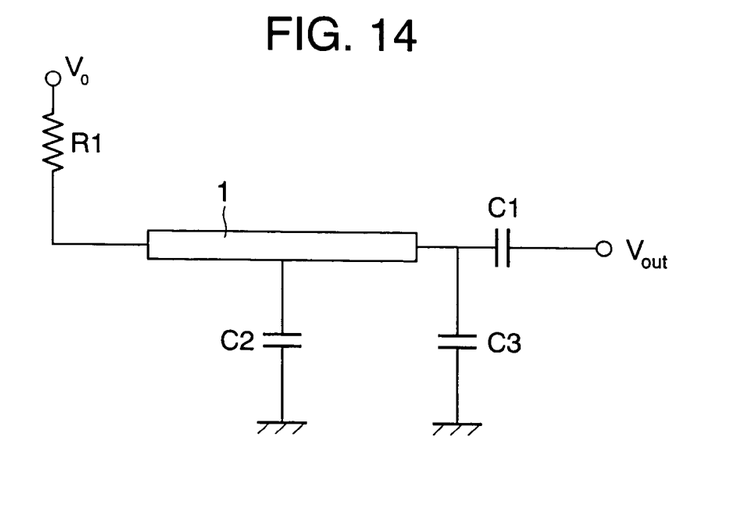
FIG. 14 is a circuit diagram to explain the principle of detection of the approach position input device shown in FIG. 13.
Figure 15:
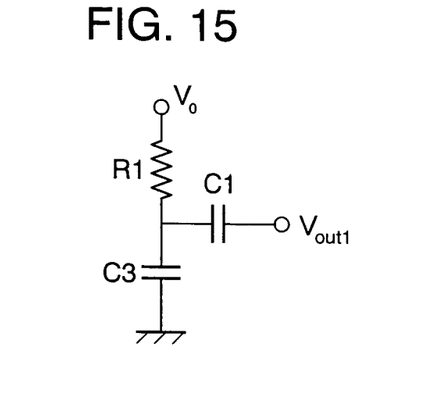
FIGS. 15 and 16 are equivalent circuits of the antenna section of FIG. 13.
Figure 16:
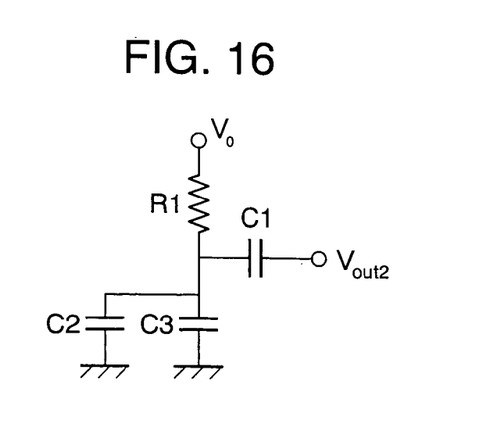

FIGS. 14 to 16 show equivalent circuits of the antenna detection circuits respectively corresponding to FIGS. 4 to 6. The circuit of FIG. 14 includes also the antenna 1. FIGS. 15 and 16 show antennas as conductors. In FIG. 15, the hand is apart from the antenna 1. In FIG. 16, the hand is near the antenna 1. When the hand is apart from the antenna 1, the electrostatic capacity C2 of the human body is not connected to the circuit. When the hand is near the antenna 1, the electrostatic capacity C2 of the human body is connected to the circuit. When an ac voltage is applied to the antenna 1, the output voltage $V_{out2}$ is less than the output voltage $V_{out1}$ by an amount of a current flowing into the circuit through the human body. Therefore, whether or not the human body is in the vicinity of the antenna 1 can be detected by measuring the output voltage $V_{out}$.

Figure 17:
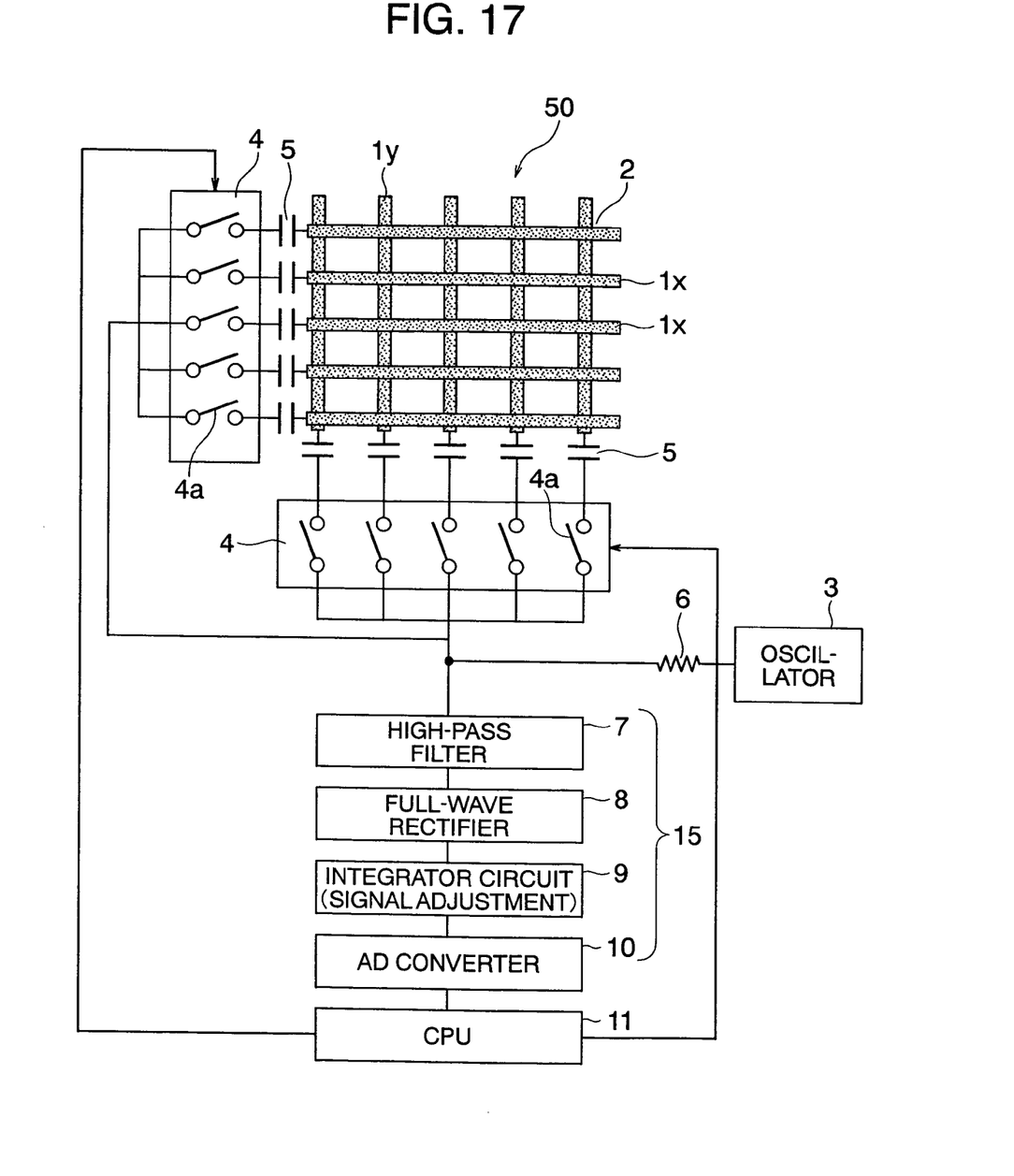
FIG. 17 is a block diagram showing still another embodiment of an approach position input device according to the present invention.

Referring next to FIG. 17, description will be given of a further another embodiment of the approach position input device 50 according to the present invention. This embodiment differs from those described above in that the resistor 6 and the oscillator 3 are connected between the change-over switch 4 and the signal processing circuit 15. In the present embodiment, since an oscillation signal produced from the oscillator 3 is applied only to an antenna selected by the change-over switch 4, the output signal is not influenced by adjacent antennas. Resultantly, the detection performance is increased. Since the signal from the oscillator 3 is connected to one position, the number of resistors 6 and wirings can be reduced. Consequently, the approach position input device can be simplified and the size thereof is reduced.

According to the present invention, the antennas arranged in a two-dimensional way can selectively conduct input and output operations in the x and y directions. Therefore, the approach position input device can detect a plurality of points of a human body such as fingertips and can detect an object via an insulator. Since the position of the human body can be detected through a small number of signal acquiring operations, the detection period of time can be reduced. Also, it is possible to reduce the size of the approach position input device and the configuration thereof can be simplified.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An approach position input device, comprising:
   a plurality of first antennas arranged substantially in parallel with each other;
   a plurality of second antennas arranged substantially in parallel with each other, the second antennas being arranged in a direction to intersect the first antennas;
   an oscillator circuit for applying an alternating current voltage to the first and second antennas;
   a signal processing circuit for processing signals output from the first and second antennas, the signal processing circuit comprising:
      a high-pass filter for extracting signals having a frequency equal to or more than a predetermined frequency from the signals sent from the first and second antennas,
      a full-wave rectifier for conducting full-wave rectification for signals filtered by the high-pass filter,
      an integrating circuit for integrating a signal output from the full-wave rectifier, and
      an analog-to-digital (AD) converter for converting an analog signal integrated by the integrating circuit into a digital signal;
   a change-over switch for selectively sending the output signals from the first and second antennas to the signal processing circuit, the change-over switch sending the output signals from the first and second antennas to the signal processing circuit one at a time; and
   a computing device for outputting a signal causing the change-over switch to perform a change-over operation.

2. The approach position input device according to claim 1, wherein the signal processing circuit obtains difference values of the first and second antennas by subtracting reference values of the respective antennas beforehand obtained for the antennas from the signals output from the first antennas and the signals output from the second antennas and determines that a human body or the like is in the vicinity if any ones of the difference values are equal to or more than a predetermined value.

3. The approach position input device according to claim 2, wherein the signal processing circuit determines an intersection between the first antenna of which the difference value equal to or more than a predetermined value and the second antenna of which the difference value equal to or more than a predetermined value and recognizes the intersection as a point of approach of the human body.

4. The approach position input device according to claim 1, wherein when the first antennas are n in number (n is a positive integer) and the second antennas are m in number (m is a positive integer), the change-over switch detects approach of the human body in a unit of (n+m) change-over operations.

5. The approach position input device according to claim 4, wherein the change-over switch first sequentially changes over n first antennas and then sequentially changes over m second antennas.

6. The approach position input device according to claim 1, further comprising an insulator between the first antennas and the second antennas.

7. An approach position input device, comprising:
   a plurality of antennas arranged in the form of a lattice;
   an oscillator circuit for applying a high-frequency ac voltage to the antennas;
   resistors connected between the oscillator circuit and the antennas;
   a signal processing circuit for processing signals output from the antennas;
   a change-over switch disposed between the antennas and the signal processing circuit for sequentially changing over the antennas; and
   a computing device for sending an antenna selection signal to the change-over switch.
   a computing device for sending an antenna selection signal to the change-over switch.

8. The approach position input device according to claim 7, wherein:
   the signal processing circuit detects reduction in the ac voltage applied to the antennas by a capacitor virtually formed, when a human body approaches the antennas, between the human body and the antennas; and
   the computing device determines that a human body is in the vicinity according to a detection signal produced at detection of the reduction in the ac voltage.

9. The approach position input device according to claim 7, wherein:
  the antennas are arranged in an x direction and a y direction vertical to the x direction;
  the change-over switch sends signals to the signal processing circuit by sequentially changing over the x-directional and y-directional antennas; and
  for each of the x-directional and y-directional antennas, when a signal associated with the antenna sent from the signal processing circuit differs from a reference value thereof by a value equal to or more than a predetermined value, the computing device selects the antenna to thereby select at least one x-directional antenna and at least one y-directional antenna and determines an approach position of the human body according to the x-directional and y-directional antennas selected as above.

10. The approach position input device according to claim 8, wherein:
  the antennas are arranged in an x direction and a y direction vertical to the x direction;
  the change-over switch sends signals to the signal processing circuit by sequentially changing over the x-directional and y-directional antennas; and
  for each of the x-directional and y-directional antennas, when a signal associated with the antenna sent from the signal processing circuit differs from a reference value thereof by a value equal to or more than a predetermined value, the computing device selects the antenna to thereby select at least one x-directional antenna and at least one y-directional antenna and determines an approach position of the human body according to the x-directional and y-directional antennas selected as above.

11. An approach position input device, comprising:
a plurality of antennas arranged in the form of a lattice;
an oscillator circuit for applying a high-frequency ac voltage to the antennas;
a signal processing circuit for processing signals output from the antennas;
a change-over switch connected to the antennas for sequentially changing over the antennas;
a resistor connected between the oscillator circuit and the antennas; and
a computing device for sending an antenna selection signal to select one of the antennas to the change-over switch and calculating an approach position of a human body according to a signal from the signal processing circuit,
wherein the oscillator circuit is connected via the resistor to a position between the change-over switch and the signal processing circuit to apply the ac voltage from the oscillator circuit only to an antenna selected according to the antenna selection signal.

* * * * *